United States Patent
Doherty

(10) Patent No.: US 9,340,338 B1
(45) Date of Patent: May 17, 2016

(54) WATER PIPE END CAP

(71) Applicant: Darren Doherty, Mississauga (CA)

(72) Inventor: Darren Doherty, Mississauga (CA)

( * ) Notice: Subject to any disclaimer, the term of this patent is extended or adjusted under 35 U.S.C. 154(b) by 83 days.

(21) Appl. No.: 14/279,672

(22) Filed: May 16, 2014

(51) Int. Cl.
*F16L 55/10* (2006.01)
*B65D 59/06* (2006.01)
*F16L 55/11* (2006.01)

(52) U.S. Cl.
CPC ............... *B65D 59/06* (2013.01); *F16L 55/11* (2013.01); *F16L 55/1141* (2013.01)

(58) Field of Classification Search
CPC .............................. F16L 55/11; F16L 55/1141
USPC ................... 138/89, 96 R; 220/800, 801, 802
See application file for complete search history.

(56) References Cited

U.S. PATENT DOCUMENTS

| | | | |
|---|---|---|---|
| 2,145,705 A | | 1/1939 | Wodtke |
| 2,663,451 A * | 12/1953 | Yarnall | B65D 39/00 220/284 |
| 3,574,312 A | 4/1971 | Miller | |
| 3,858,848 A | 1/1975 | MacFetrich | |
| 5,197,605 A * | 3/1993 | Hampton | B65D 71/00 138/89 |
| 5,327,942 A * | 7/1994 | Black | F16L 55/1141 138/89 |
| 5,694,978 A * | 12/1997 | Heilmann | F16L 55/1152 138/103 |
| 6,032,695 A * | 3/2000 | Wellen | B63B 17/04 138/89 |
| 6,494,463 B1 * | 12/2002 | Rank | E04G 23/0203 138/89 |
| 8,763,831 B2 * | 7/2014 | Garcia | B65D 39/0023 215/320 |
| 2005/0000973 A1 * | 1/2005 | Sbongk | F16J 13/14 220/802 |
| 2008/0029176 A1 * | 2/2008 | Horan | F16L 55/1108 138/89 |
| 2008/0053548 A1 * | 3/2008 | Ellery | G09F 3/00 138/104 |
| 2012/0192980 A1 * | 8/2012 | Williams | F16L 55/11 138/89 |

\* cited by examiner

*Primary Examiner* — James Hook
(74) *Attorney, Agent, or Firm* — Crossley & Stevenson IP Law

(57) ABSTRACT

A water pipe end cap having a front end and a rear end. The front end has a tapered tip. A flattened head is disposed on the tapered tip. A tapered buttress is also disposed on the tapered tip. The rear end has an elongate cylindrical male piece, a rounded buttress, a tapered heel, and at least one rigidly flexible raised ridge. Each of the rounded buttress, the tapered heel, and the raised ridge are configured to frictionally engage the inner wall surface of the water pipe preventing the water pipe end cap from becoming disengaged. The tapered buttress snugly covers the terminal end of the water pipe preventing dirt and grit from entering. The tapered tip prevents the water pipe from snagging or getting stuck on ribbed conduits. An elongated cylindrical inner cavity is continuously disposed within each of the male piece, the tapered buttress, and the tapered tip.

5 Claims, 2 Drawing Sheets

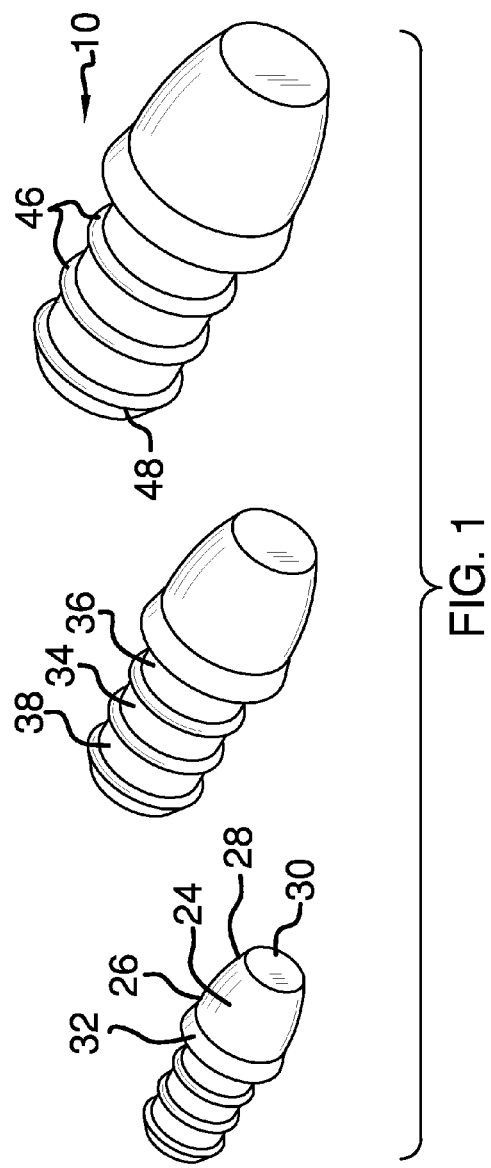
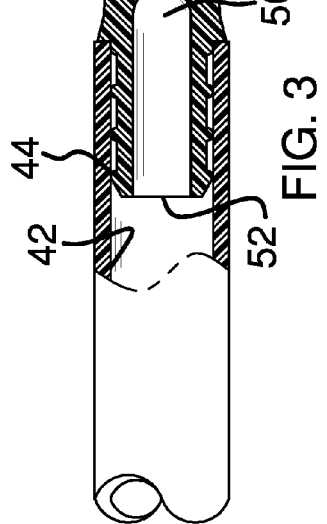
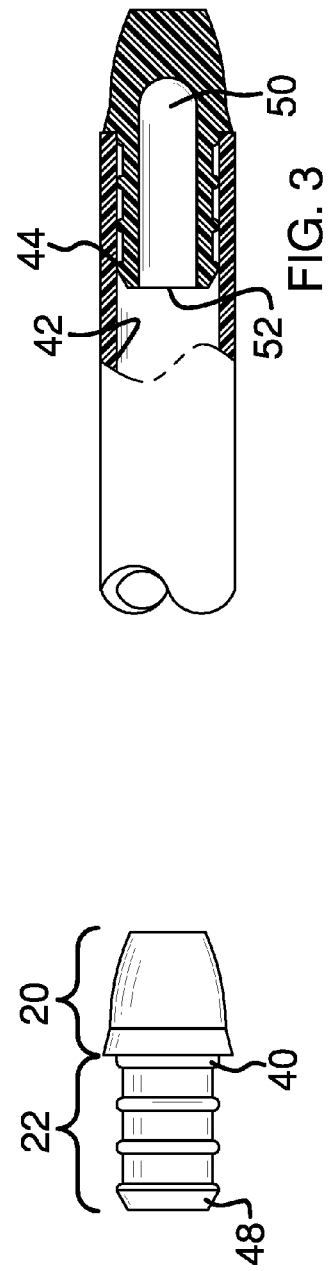

WATER PIPE END CAP

BACKGROUND OF THE INVENTION

In new construction projects it is necessary to route water pipes through various conduits so that the finished construct is serviceable with potable water. Because these water pipes are servicing potable water, it is necessary to prevent dirt and grit from entering the pipes as can happen while routing the water pipe through a conduit. Additionally, it is usually necessary to route the water pipe through at least one ribbed conduit while servicing the finished construct. While routing the water pipe through the ribbed conduit, the terminal end of the water pipe often snags and gets stuck on one of the ribs of the conduit. Generally, plumbers will attempt to prevent this problem by covering the terminal end of the pipe with duct tape or an analogous form of plumbing tape. Said method does an inconsistent job of keeping the inner water pipe sterile and fails to prevent the water pipe from snagging on ribbed conduits.

Thus, what is needed is water pipe end cap having a tapered tip, a flattened head, a tapered buttress, an elongate cylindricla male piece, a rounded buttress, a tapered heel, an elongated cylindrical inner cavity, and at least one rigidly flexible raised ridge. The present water pipe end cap makes it easier to thread a water pipe through a ribbed conduit by preventing the terminal end of the water pipe from snagging or getting stuck on the ribbed portions of conduits. The present invention also prevents dirt and grit from entering the terminal portion of the water pipe whilst threading a conduit, by snuggly covering the terminal end.

FIELD OF THE INVENTION

The present invention relates to an end cap, and more particularly, to a water pipe end cap.

SUMMARY OF THE INVENTION

The general purpose of the present water pipe end cap, described subsequently in greater detail, is to provide a water pipe end cap which has many novel features that result in a water pipe end cap which is not anticipated, rendered obvious, suggested, or even implied by prior art, either alone or in combination thereof.

The water pipe end cap includes a front end and a rear end. The front end has a generally frustoconical tapered tip. The tapered tip has a proximal end and a distal end. A flattened head is disposed upon the distal end of the tapered tip. The flattened head decreases manufacturing costs by decreasing the material used in the construction of the apparatus without sacrificing the ability to prevent the water pipe end cap from snagging on edges or ribs of a conduit as the water pipe and water pipe end cap are thread through a conduit. A tapered buttress is disposed upon the proximal end of the tapered tip. The tapered buttress is configured to support the tapered tip to prevent bending of the tip. The tapered buttress also has a flattened portion. In use, the flattened portion engages the terminal end of a water pipe and covers the terminal end. Covering the terminal end of the water pipe is critical to prevent the edge of the water pipe from snagging and getting stuck on the ribs of ribbed conduits whilst threading the water pipe through the conduits. It is also critical to prevent dirt and grit from entering the water pipe, which is essential whilst threading water pipes that service potable water.

The rear end has an elongate cylindrical male piece extending longitudinally away from the front end. The male piece has a forward end and a rearward end. A rounded buttress is circumferentially disposed upon the male piece proximal the forward end. The tapered buttress is in contact with and supported by the rounded buttress. The rounded buttress is configured to adapt to and frictionally engage an inner wall surface of a water pipe.

At least one rigidly flexible raised ridge circumferentially is disposed upon the male piece around a longitudinal axis of the male piece. Each of the at least one ridge is configured to adapt to and frictionally engage the inner wall surface of the water pipe. FIGS. 1 and 2 illustrate an embodiment with two raised ridges.

A tapered heel is disposed upon the rearward end of the male piece. The tapered heel directs the water pipe end cap into the terminal end of the water pipe as it is being inserted. The tapered heel is configured to frictionally engage the inner wall surface of the water pipe. An elongated cylindrical inner cavity is continuously disposed within each of the male piece, the tapered buttress, and the tapered tip. The inner cavity has an aperture disposed proximal the tapered heel. The inner cavity decreases the weight of the water pipe end cap allowing for lighter, easier, and more accurate maneuverability while in use. Additionally, the inner cavity decreases the manufacturing costs of the unit. The water pipe end cap is formed of a continuously molded piece of rubber, and alternately formed of a continuously molded piece of plastic, however, other materials are envisioned that would fit the spirit and scope of the invention including various polymers as well as different types of metal.

The water pipe end cap can be formed in a variety of dimensions to fit the various types of water pipes. In the preferred embodiment the water pipe end cap is configured to frictionally engage the terminal end of a cross-linked polyethylene water pipe. The rear end is of sufficient length and width to frictionally engage the inner wall of the water pipe and can be 1.5 to 2 times the length of the front end although other dimensions are envisioned.

Thus has been broadly outlined the more important features of the present water pipe end cap so that the detailed description thereof that follows may be better understood and in order that the present contribution to the art may be better appreciated.

Numerous objects, features and advantages of the present water pipe end cap will be readily apparent to those of ordinary skill in the art upon reading the following detailed description of presently preferred, but nonetheless illustrative, examples of the present water pipe end cap when taken in conjunction with the accompanying drawings.

BRIEF DESCRIPTION OF THE DRAWINGS

Figures

FIG. 1 is an isometric view.
FIG. 2 is a front view.
FIG. 3 is an in-use side view.

DETAILED DESCRIPTION OF THE DRAWINGS

Figure 4:
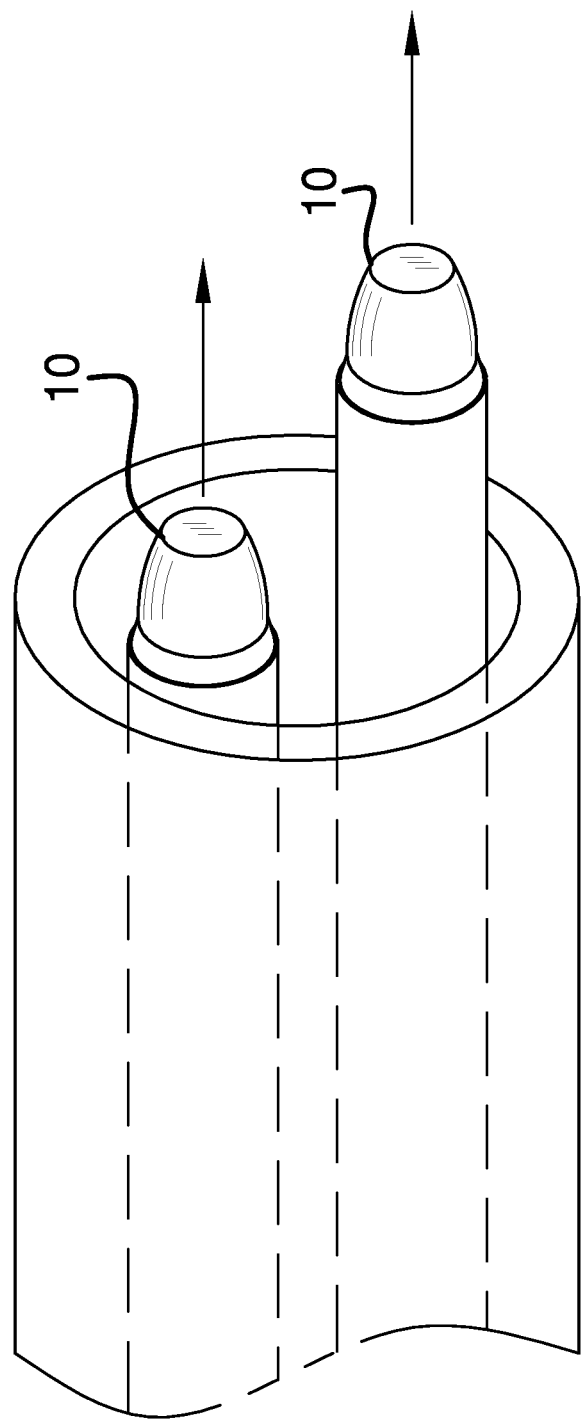
FIG. 4 is an in-use isometric view.

With reference now to the drawings, and in particular FIGS. 1 through 4 thereof, the instant water pipe end cap employing the principles and concepts of the present water pipe end cap and generally designated by the reference number 10 will be described.

Referring to FIGS. 1 through 4 a preferred embodiment of the present water pipe end cap 10 is illustrated. The water pipe end cap 10 includes a front end 20 and a rear end 22. The front end 20 has a generally frustoconical tapered tip 24. The tapered tip 24 has a proximal end 26 and a distal end 28. A flattened head 30 is disposed upon the distal end 28 of the tapered tip 24. A tapered buttress 32 is disposed upon the proximal end 26 of the tapered tip 24.

The rear end 22 has an elongate cylindrical male piece 34 extending longitudinally away from the front end 20. The male piece 34 has a forward end 36 and a rearward end 38. A rounded buttress 40 is circumferentially disposed upon the male piece 34 proximal the forward end 36. The tapered buttress 32 is in contact with and supported by the rounded buttress 40. The rounded buttress 40 is configured to adapt to and frictionally engage an inner wall surface 42 of a water pipe 44.

At least one rigidly flexible raised ridge 46 circumferentially is disposed upon the male piece 34 around a longitudinal axis of the male piece 34. Each of the at least one ridge 46 is configured to adapt to and frictionally engage the inner wall surface 42 of the water pipe 44.

A tapered heel 48 is disposed upon the rearward end 38 of the male piece 34. The tapered heel 48 is configured to frictionally engage the inner wall surface 42 of the water pipe 44. An elongated cylindrical inner cavity 50 is continuously disposed within each of the male piece 34, the tapered buttress 32, and the tapered tip 24. The inner cavity 50 has an aperture 52 disposed proximal the tapered heel 48. The water pipe end cap 10 is formed of a continuously molded piece of rubber, and alternately formed of a continuously molded piece of plastic, however, other materials are envisioned that would fit the spirit and scope of the invention including various polymers as well as different types of metal.

What is claimed is:

1. A water pipe end cap comprising:
   a front end and a rear end, the front end having a generally frustoconical tapered tip, the tapered tip having a proximal end and a distal end,
   a flattened head disposed upon the distal end of the tapered tip;
   a tapered buttress disposed upon the proximal end of the tapered tip;
   the rear end having an elongate cylindrical male piece, the male piece having a forward end and a rearward end;
   at least one rigidly flexible raised ridge circumferentially disposed upon the male piece around a longitudinal axis of the male piece, each of the at least one ridge configured to adapt to and frictionally engage an inner wall surface of a water pipe;
   a tapered heel disposed upon the rearward end of the male piece, the tapered heel configured to frictionally engage an inner wall surface of a water pipe; and
   an elongated cylindrical inner cavity continuously disposed within each of the male piece, the tapered buttress, and the tapered tip, the inner cavity having an aperture disposed proximal the tapered heel.

2. The water pipe end cap of claim 1 further comprising:
   a rounded buttress circumferentially disposed upon the male piece proximal the forward end, the tapered buttress in contact with and supported by the rounded buttress, the rounded buttress configured to adapt to and frictionally engage the inner wall surface of the water pipe.

3. The water pipe end cap of claim 2 wherein the water pipe end cap is formed of a continuously molded piece of plastic.

4. The water pipe end cap of claim 2 wherein the water pipe end cap is formed of a continuously molded piece of rubber.

5. A water pipe end cap comprising:
   a front end and a rear end, the front end having a generally frustoconical tapered tip, the tapered tip having a proximal end and a distal end,
   a flattened head disposed upon the distal end of the tapered tip;
   a tapered buttress disposed upon the proximal end of the tapered tip;
   the rear end having an elongate cylindrical male piece, the male piece having a forward end and a rearward end;
   a rounded buttress circumferentially disposed upon the male piece proximal the forward end, the tapered buttress in contact with and supported by the rounded buttress, the rounded buttress configured to adapt to and frictionally engage an inner wall surface of a water pipe;
   at least one rigidly flexible raised ridge circumferentially disposed upon the male piece around a longitudinal axis of the male piece, each of the at least one ridge configured to adapt to and frictionally engage the inner wall surface of the water pipe;
   a tapered heel disposed upon the rearward end of the male piece, the tapered heel configured to frictionally engage an inner wall surface of a water pipe; and
   an elongated cylindrical inner cavity continuously disposed within each of the male piece, the tapered buttress, and the tapered tip, the inner cavity having an aperture disposed proximal the tapered heel;
   wherein the water pipe end cap is formed of a continuously molded piece of rubber, and alternately formed of a continuously molded piece of polymer.

\* \* \* \* \*